Figures 1, 2, 3:
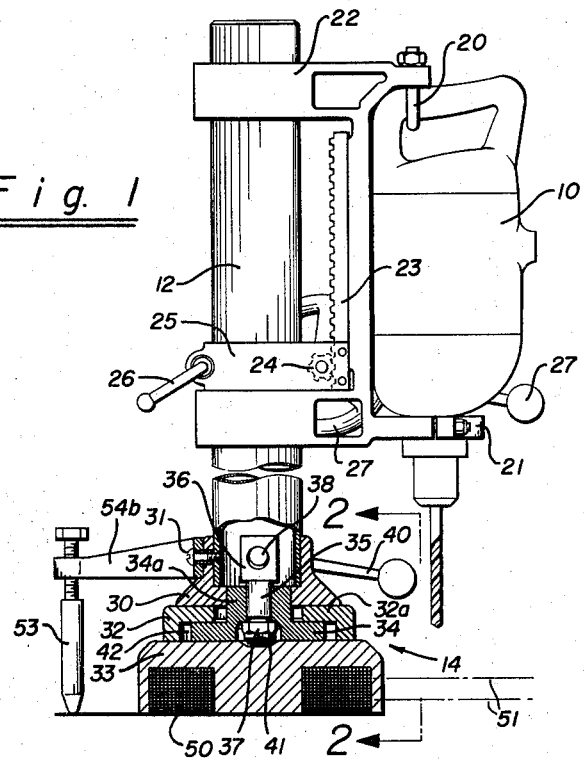

RE 26037

May 31, 1960   D. E. HERFURTH   2,938,411
SUPPORT ARRANGEMENT FOR ELECTRIC DRILLS, OR THE LIKE
Filed March 15, 1956

INVENTOR.
Donald E. Herfurth
BY
Paul B. Eike
Patent Agent

United States Patent Office 2,938,411
Patented May 31, 1960

2,938,411

SUPPORT ARRANGEMENT FOR ELECTRIC DRILLS, OR THE LIKE

Donald E. Herfurth, Cupertino, Calif., assignor to Magnetic Tool Corp., San Francisco, Calif., a corporation of California Filed Mar. 15, 1956, Ser. No. 571,738

2 Claims. (Cl. 77—59)

This invention relates to drilling devices, and more particularly, to an arrangement for supporting a portable electric drill or the like in proper relationship to a metallic work piece.

Various supporting arrangements have been suggested to provide for the clamping and supporting of portable electric drills on the piece to be worked through the use of electro-magnetic force. However, a very real difficulty has been experienced with respect to known deices in attempting to precisely position the drill over the desired point on the metallic work piece prior to the establishment of the electro-magnetic clamping connection therewith. If the drill position is not correct, it becomes necessary to deenergize the electro-magnet and then attempt to make re-adjustment. Since both adjustment and re-adjustment must be made while the entire unit is manually supported, accurate centering of the drill, particularly when a hole is to be drilled into a vertical surface, becomes a tedious, time-consuming procedure.

It is accordingly a primary object of the present invention to provide a support arrangement for portable electric drills, or the like, that facilitates positioning of the drill accurately with respect to the work piece.

It is a feature of the invention to provide a support arrangement for a portable electric drill that enables adjustment of the drill position while substantially the entire weight of the unit is supported from the work piece.

Additionally, it is a feature to enable a stabilized support for the portable drill on metallic surfaces of varying contour.

These and other objects and features of the invention and the advantages stemming therefrom will become apparent from a perusal of the following description of the drawings wherein:

Fig. 1 is a side elevational view of a support arrangement for a portable electric drill embodying the present invention, parts being broken away to illustrate details of interior construction, Fig. 2 is a fragmentary side elevational view of the lower portion of the unit as viewed along line 2—2 of Fig. 1, and Fig. 3 is a sectional view taken along line 3—3 of Fig. 2.

As shown in Fig. 1, a preferred arrangement generally contemplates the support of a portable electric drill 10 from a vertical column 12 for controlled up and down motion; and such column is, in turn, supported at its lower end upon a base or pedestal, generally indicated at 14, in a manner such that the disposition of the column 12 can be shifted laterally of the pedestal 14.

More particularly, the drill 10 is attached by clamps 20 and 21 to a carriage 22 that is adapted to slide upwardly or downwardly on the mentioned column 12 which is of hollow cylindrical formation. To enable such sliding, the carriage 22 is formed with vertically aligned circular apertures which loosely encompass the column 12. When so mounted, the carriage 22 supports the drill 10 with its axis in substantial parallelism with the axis of the cylindrical column 12.

To provide for the actuation of up and down movement of the drill 10, a rack 23 is formed on the carriage, and a pinion gear 24 is rotatably supported on a bracket 25 in a position such that the pinion meshes with the rack. The bracket 25 is in the form of a C-clamp that encompasses the column 12 and can be fixed in a desired vertical position thereon by the turning of a screw (not shown) with an attached handle 26. In order to rotate the pinion 24 and thus shift the vertical position of the drill 10 with respect to the column 12, a conventional hand wheel 27 is provided.

In accordance with the present invention, the lower end of the cylindrical column 12 is centrally received within a socket member 30 and is held in such position by screws 31. Such socket member 30 is adapted to rest upon the upper surface of an inturned shoulder or flange 32a of an annular member 32 forming part of the previously mentioned base or pedestal 14. Such annular member 32 is fixed to a block 33 of circular outline that forms the main body portion of the base 14 and has a flat upper surface that is spaced from the described shoulder 32a of the annular member 32. A generally circular disc 34 is disposed within the space between the block 33 and the shoulder 32a described above; and means are provided to urge such disc upwardly whereby the shoulder 32a is clamped between the upper surface of the disc 34 and the lower surface of the socket member 30 resting on such shoulder, as previously described. To enable such clamping action, a rod 35 is secured to project downwardly through a central opening in the disc 34 from a transversely-apertured block 36 disposed within the hollow cylindrical column 12; and such rod is threaded at its lower end whereby a nut 37 can be applied to engage and support the described disc thereon. An integral projection 34a on the disc is slidably engaged by the interior wall of a central opening in the socket member 30 so that the movement of the disc is guided.

The transverse opening in the rod-suspending block 36 is of circular configuration and a shaft 38 extends therethrough, the same being eccentrically supported in suitable bearings 39 in the wall of the column 12 and socket member 30. Exteriorly of the column 12, a handle 40 is attached to the shaft 38; and upon manual actuation of this handle, the eccentric shaft 38 will cause the rod 35 and the disc 34 supported thereon to move upwardly whereby clamping engagement with the described shoulder 32a is established.

The rod 35 passes loosely through the clamping disc 34 so that if clamping engagement has not been established the column 12 and attached socket member 30, as well as the rod, can be rotated relative to the disc 34 and the associated pedestal 14. To preclude loosening of the nut 37, it is secured on the rod 35 by a locking pin 41.

In addition to such permitted rotation of the column 12, limited radial displacement of the column 12 relative to the axis of the circular base 14 is enabled. For this purpose, a slight lateral clearance is provided between the outer periphery of the disc 34 and the inner surface of the annular member 32, as indicated at 42; and the disc is adapted to shift laterally about a pivot pin 43, which extends vertically between the described shoulder 32a and the block 33, as shown in Fig. 2. To actuate transverse movement of the disc 34, a handle 44 is secured thereto so as to project laterally through an opening in the side of the annular member 32. When the handle 44 is manually actuated, the disc 34, the socket member 30, and column 12 are moved about the axis of the pivot pin 43; and the drill 10 supported from the column 12, of course, partakes of such motion. As best illustrated in Fig. 3, movement of the handle 44 to the three positions indicated at A, B, and C will effect corresponding shifting of the axis of the drill 10 to the positions indicated at a, b, and c. In this manner, limited shifting motion of the drill 10 radially with respect to the central axis of the pedestal in a radial direction is enabled.

The block 33 which constitutes the main portion of the pedestal 14 is formed of a ferro-magnetic material and has an annular opening therein for the reception of a coil 50 to which direct current is supplied through wires diagrammatically shown at 51 from a suitable source (not shown). Thus, such block 33 is actually an electromagnet, so that upon its energization, as described, the pedestal 14 will firmly attach itself to the surface of, for example, a steel plate that is to be drilled.

When the drill 10 is brought into drilling engagement with the metal, a reactive force is provided that tends to tilt the electro-magnetic pedestal 14 to break the established connection with the metallic work. To reduce the possibility of such separation of the magnet from the work, a pair of stabilizing legs 52, 53 are supported from the column 12 at positions on the remote side thereof from the drill 10. For support purposes, the upper ends of the legs 52, 53 are threaded and pass through threaded openings in the respective diverging legs 54a, 54b of a V-shaped bracket 54 that is fastened to the previously described socket member 30 by the previously mentioned screws 31. Since such two, spaced legs are provided, any tilting tendency resulting from forces applied to the hand wheel 27 will be minimized.

In operation, after a center-punch marking, or the like, has been placed upon a piece of steel to be drilled, the entire unit is placed in engagement with the work with the axis of the drill 10 approximately over such marking. The coil 50 is now energized to establish electro-magnetic connection with the work, and the hand wheel 27 is rotated to bring the point of the drill 10 downwardly adjacent such work. If the drill 10 is aligned with the marking, the drilling operation may proceed; however, in practice, precise alignment of the drill 10 with the marking by the crude visual approximation described is seldom attained. If the alignment is not exact, it is merely necessary first to release the clamping disc 34 by movement of the clamp handle 40 and thereafter to rotate the column 12 and laterally shift the same through manual actuation of the disc handle 44, to bring the drill 10 quickly and easily into precise alignment with the marking.

It is not necessary to disestablish the connection with the work provided by the electro-magnetic pedestal; and this fact is of particular importance when drilling into a vertically disposed surface or an overhead one. Only rotation of the column 12 and limited transverse movement relative to the pedestal 14 is enabled when the clamping disc 34 is disengaged from the shoulder 32a; the column 12 and drill 10 remain substantially fully supported by the established electro-magnetic connection with the work. What little motion is required to bring the drill into alignment with the desired point of drilling on the work can be manually effected without great expenditure of effort; it being understood that the weight of the unit remains supported by the electro-magnetic pedestal 14 itself.

Various modifications and/or alterations can obviously be made without departing from the spirit of the present invention, and the foregoing description is to be considered as purely exemplary and not in a limiting sense; the actual scope of the invention being indicated by the appended claims.

What is claimed is:

1. A support arrangement for a drilling device which comprises a base having an annular inturned shoulder thereon and defining a predetermined axis, a drill supporting column supported on the upper side of said shoulder for displacement thereon, a member rotatably connected to said column and adapted to engage the underside of said shoulder, means interconnecting said member and said column to urge the same toward one another whereby clamping engagement is established with said shoulder to preclude displacement of said column thereon, and means pivotally connecting said member to said base at a position such that the pivotal axis is parallel to but offset from the axis defined by said base.

2. In an electromagnetic drill mount, a frame structure comprising an upright post having means for supporting a drill bit for vertical adjusting movement with respect thereto, a base structure forming a supporting foot for said frame structure and including an electromagnet, a plate-like member secured to the upper surface of said electromagnet, a base member for said post secured thereto and engaging at its bottom surface the upper surface of said plate-like member, said plate-like member having an opening therein, said base member also having an opening therein, a clamping member extending through said openings, means for clamping the base member and clamping member with the plate-like member therebetween, said clamping member having an aperture extending transversely therethrough, said clamping means being supported in said base member and including eccentric shaft means extending through said transverse aperture for engaging and vertically actuating said apertured clamping member, whereby the post and electromagnet may be clamped in a selected relative position.

References Cited in the file of this patent

UNITED STATES PATENTS

| | | |
|---|---|---|
| 676,043 | Lincoln | June 11, 1901 |
| 2,039,715 | Hane | May 5, 1936 |
| 2,672,770 | Buck | Mar. 23, 1954 |

FOREIGN PATENTS

| | | |
|---|---|---|
| 399,400 | France | June 28, 1909 |